United States Patent
Kanuri et al.

(10) Patent No.: US 7,099,285 B1
(45) Date of Patent: Aug. 29, 2006

(54) REMOTE CONFIGURATION OF A SUBNET CONFIGURATION TABLE IN A NETWORK DEVICE

(75) Inventors: Mrudula Kanuri, Santa Clara, CA (US); Somnath Viswanath, San Jose, CA (US); Gopal S. Krishna, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 977 days.

(21) Appl. No.: 09/881,019

(22) Filed: Jun. 15, 2001

(51) Int. Cl.
*H04L 12/16* (2006.01)
*H04L 12/28* (2006.01)

(52) U.S. Cl. ............... 370/254; 370/395.32; 370/400; 370/401

(58) Field of Classification Search ........... 370/254, 370/389, 392, 395.3, 400, 395.31, 395.32, 370/401; 709/217–224, 238, 242, 243
See application file for complete search history.

(56) References Cited

U.S. PATENT DOCUMENTS

| | | | | |
|---|---|---|---|---|
| 5,751,967 A * | 5/1998 | Raab et al. | ................. | 709/228 |
| 5,825,772 A * | 10/1998 | Dobbins et al. | ............ | 370/396 |
| 5,878,232 A * | 3/1999 | Marimuthu | ................. | 709/249 |
| 5,909,549 A * | 6/1999 | Compliment et al. | ........ | 709/223 |
| 6,018,567 A * | 1/2000 | Dulman | ................... | 379/32.03 |
| 6,041,166 A * | 3/2000 | Hart et al. | .................. | 709/238 |
| 6,075,776 A * | 6/2000 | Tanimoto et al. | ........... | 370/254 |
| 6,085,238 A * | 7/2000 | Yuasa et al. | ................. | 709/223 |
| 6,101,189 A * | 8/2000 | Tsuruoka | .................... | 370/401 |
| 6,131,120 A * | 10/2000 | Reid | ........................... | 709/225 |
| 6,141,690 A * | 10/2000 | Weiman | ..................... | 709/228 |
| 6,285,688 B1 * | 9/2001 | Henderson et al. | ......... | 370/516 |
| 6,286,038 B1 * | 9/2001 | Reichmeyer et al. | ....... | 709/220 |
| 6,295,540 B1 * | 9/2001 | Sanschagrin et al. | ....... | 707/201 |
| 6,349,093 B1 * | 2/2002 | Caldwell et al. | ............ | 370/259 |
| 6,404,766 B1 * | 6/2002 | Kitai et al. | ................ | 370/392 |
| 6,662,221 B1 * | 12/2003 | Gonda et al. | ............... | 709/223 |
| 6,697,360 B1 * | 2/2004 | Gai et al. | .................... | 370/389 |
| 6,779,031 B1 * | 8/2004 | Picher-Dempsey | .......... | 709/224 |
| 6,826,176 B1 * | 11/2004 | Siddiqui et al. | ............ | 370/352 |
| 2005/0025071 A1 * | 2/2005 | Miyake et al. | .............. | 370/254 |

OTHER PUBLICATIONS

Case et al., RFC 1067, A simple Network management Protocl, Apr. 1989, Network working Group, entire document.*
Bostock, RFC 1420, SNMP over IPX, Mar. 1993, Network working Group, entire document.*

* cited by examiner

*Primary Examiner*—Doris H. To
*Assistant Examiner*—Ian N. Moore
(74) *Attorney, Agent, or Firm*—Harrity Snyder LLP

(57) ABSTRACT

A multiport switching device includes a configuration table that stores associations between addresses of subnets directly connected to the switching device and the port number of the multiport switching device that leads to the subnet. A host processor connected to the multiport switching device updates and maintains the configuration table. A remote processor communicates with the switching device through the host processor. To facilitate the communication of the remote processor with the multiport switch, the host processor executes a TCP/IP stack and the multiport switch is assigned a unique IP address.

18 Claims, 4 Drawing Sheets

| Configuration Table | |
|---|---|
| SUBNET ID | PORT VECTOR |
| xxx.yyy.zzz | 1 |
| xxx.yyy.www | 3 |
| ... | ... |

Fig. 4

REMOTE CONFIGURATION OF A SUBNET CONFIGURATION TABLE IN A NETWORK DEVICE

BACKGROUND OF THE INVENTION

1. Technical Field

The present invention relates generally to switching in a packet switched network and, more specifically, to systems and methods for configuring network switching devices.

2. Background Art

At the heart of most networks are switches interconnected via a communications medium. For example, Ethernet is a commonly used local area network scheme in which multiple stations are connected to a single shared serial data path. These stations communicate with a switch located between the shared data path and the stations connected to that path. The switch controls the communication of data packets on the network.

Networks are frequently organized into sub-networks, called subnets. Within a single subnet, packets of information may be directed to their destination devices using a layer 2 Media Access Control (MAC) address that identifies the attached Ethernet devices. When a switch receives a packet with a familiar destination MAC address, it forwards the packet to the output port on the switch that is associated with the MAC address.

Packets transmitted between layer 2 subnets do so using the destination device's IP (Internet Protocol) layer 3 address. More particularly, a transmitting device sending a packet to a destination device outside of the transmitting device's subnet first determines, using the IP layer 3 address, the layer 2 MAC address of a gateway device that bridges the subnets. The gateway device, often called a layer 3 switch, upon receiving the packet, performs address translation, which involves stripping the MAC destination address of the packet and inserting a new MAC destination address that corresponds to the MAC address of the destination device in the destination subnet. The gateway device determines the MAC address to substitute based on the IP address.

A gateway device may be directly connected to a number of subnets, such as three subnets. A table stored in the gateway device may provide a correspondence between each connected subnet and the output ports of the gateway device that connects to the subnet. In operation, when the gateway device receives a packet destined for one of the connected subnets, it looks up the appropriate output ports for the packet in the table.

Managing and updating the table in the gateway device is often done manually by a user located locally to the gateway device. This can be a time consuming and error prone process.

Thus, there is a need in the art to improve table management and updating in a gateway device.

SUMMARY OF THE INVENTION

Advantages of the invention will be set forth in part in the description which follows, and in part will be obvious from the description, or may be learned by practice of the invention. The advantages of the invention will be realized and attained by means of the elements and combinations particularly pointed out in the appended claims.

According to one aspect of the present invention, a system for transmitting packets of information includes a multiport switch connected to a plurality of subnets through ports of the multiport switch. The multiport switch includes a configuration table storing associations between IP addresses of the subnets and ports of the multiport switch. A host processor connects locally to the multiport switch and a remote processor communicates with the multiport switch through the host processor. This communication is performed using an IP address assigned to the multiport switch. The remote processor instructs the host processor to modify the configuration table in the multiport switch.

A second aspect of the present invention is directed to a method of processing packets in a network device. The method includes receiving a packet at one of a plurality of receive ports in the network device. The packet includes address information that indicates at least a destination subnet for the packet. The method further includes looking up appropriate output ports in the network device for the packet in a configuration table based on the address information and forwarding the packet to the destination subnet from the looked up output ports. Finally, the method includes updating the configuration table based on information received from a remote processor, the remote processor transmitting the information to the configuration table using an IP address uniquely assigned to the network device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is a diagram illustrating, in additional detail, the configuration table shown in FIG. 3.

BEST MODE FOR CARRYING OUT THE INVENTION

Figure 1:
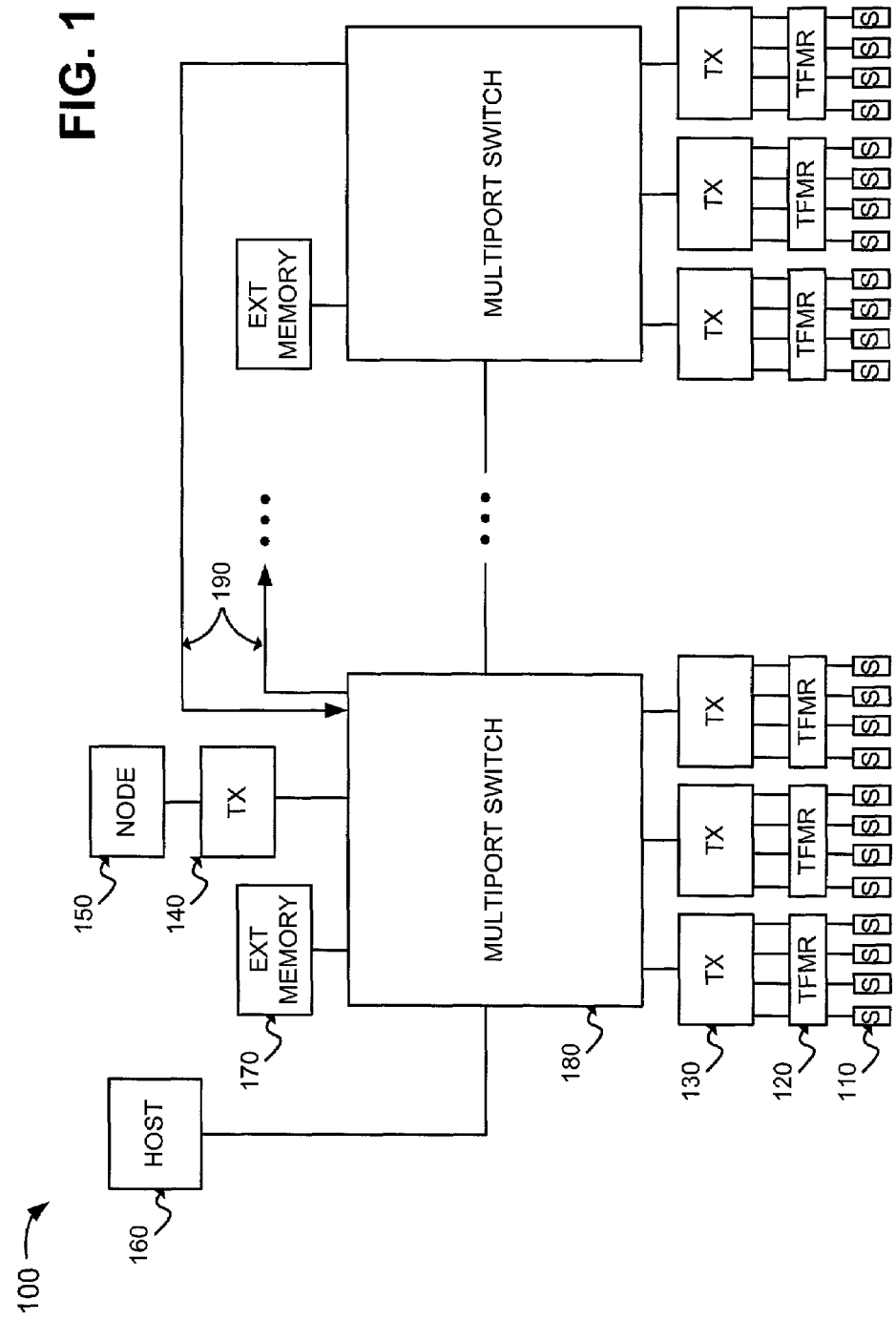
FIG. 1 is a block diagram of an exemplary system in which systems and methods consistent with the present invention may be implemented.

The following detailed description of the invention refers to the accompanying drawings. Like objects in the drawings may be referred to using the same reference numeral in different drawings. The detailed description does not limit the invention. Instead, the scope of the invention is defined by the appended claims and equivalents.

As described herein, a layer 3 switch performs both layer 2 switching and layer 3 subnet routing. The layer 3 subnet routing is performed for subnets connected to the layer 3 switch. A configuration table in the layer 3 switch stores the associations between IP addresses and the connected subnets. A host processor attached to the layer 3 switch updates the configuration table. A remote processor may communicate with the host processor to provide remote configuration and monitoring functions.

Switch Architecture Overview

FIG. 1 is a block diagram of an exemplary system in which systems and methods consistent with the present invention may be implemented. The exemplary system may include a packet switched network 100. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of all or some of multiport switches 180. Although shown as being implemented externally to multiport switch 180, a host processor 160 could alternatively be implemented as part of each multiport switch 180.

The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
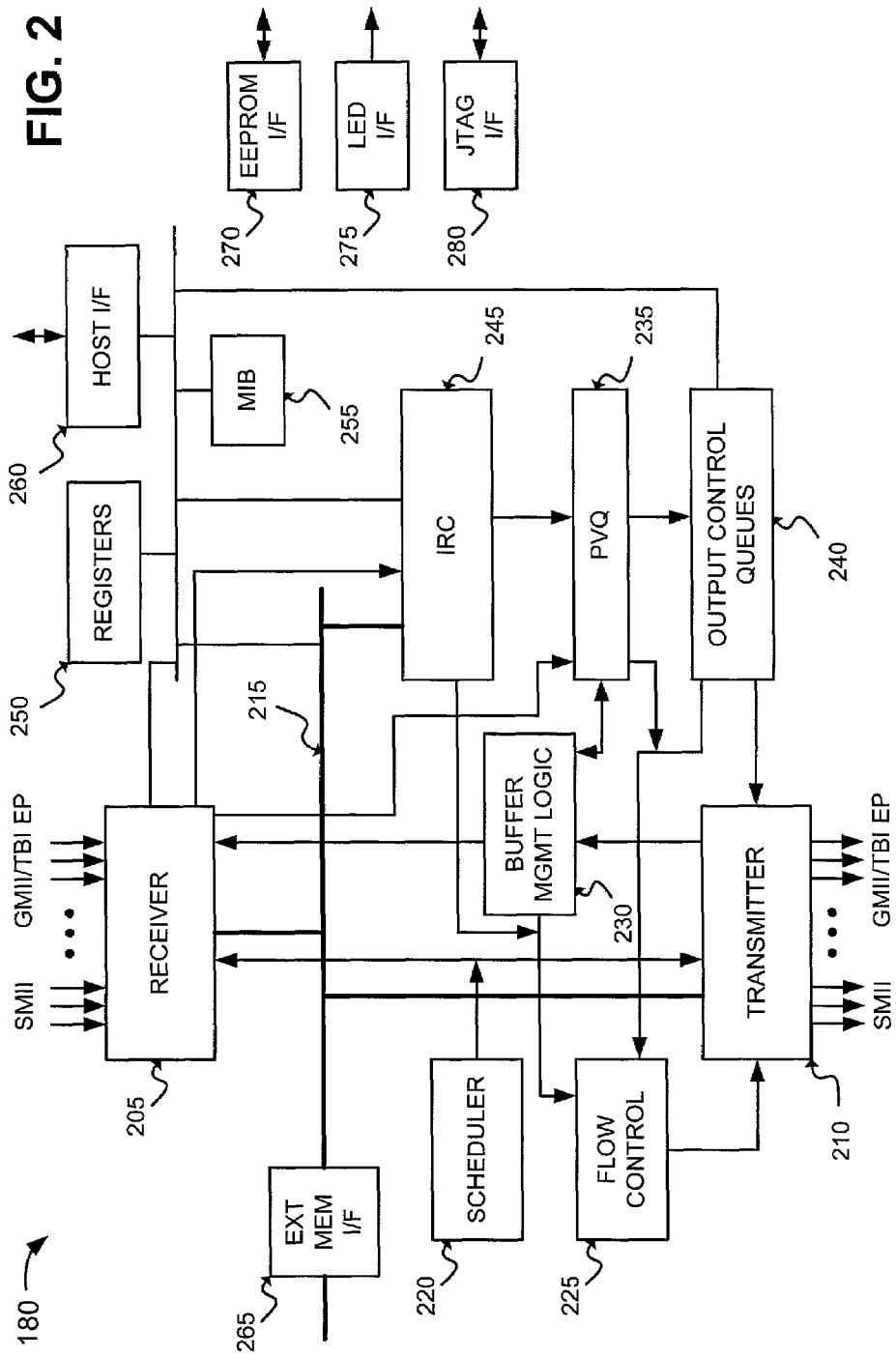
FIG. 2 is a detailed diagram of a multiport switch according to an implementation consistent with the present invention.

FIG. 2 is a detailed diagram of the multiport switch 180 according to an implementation consistent with the present invention. Multiport switch 180 may be a layer 3 switch. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

Multiport Switch Operation

Figure 3:
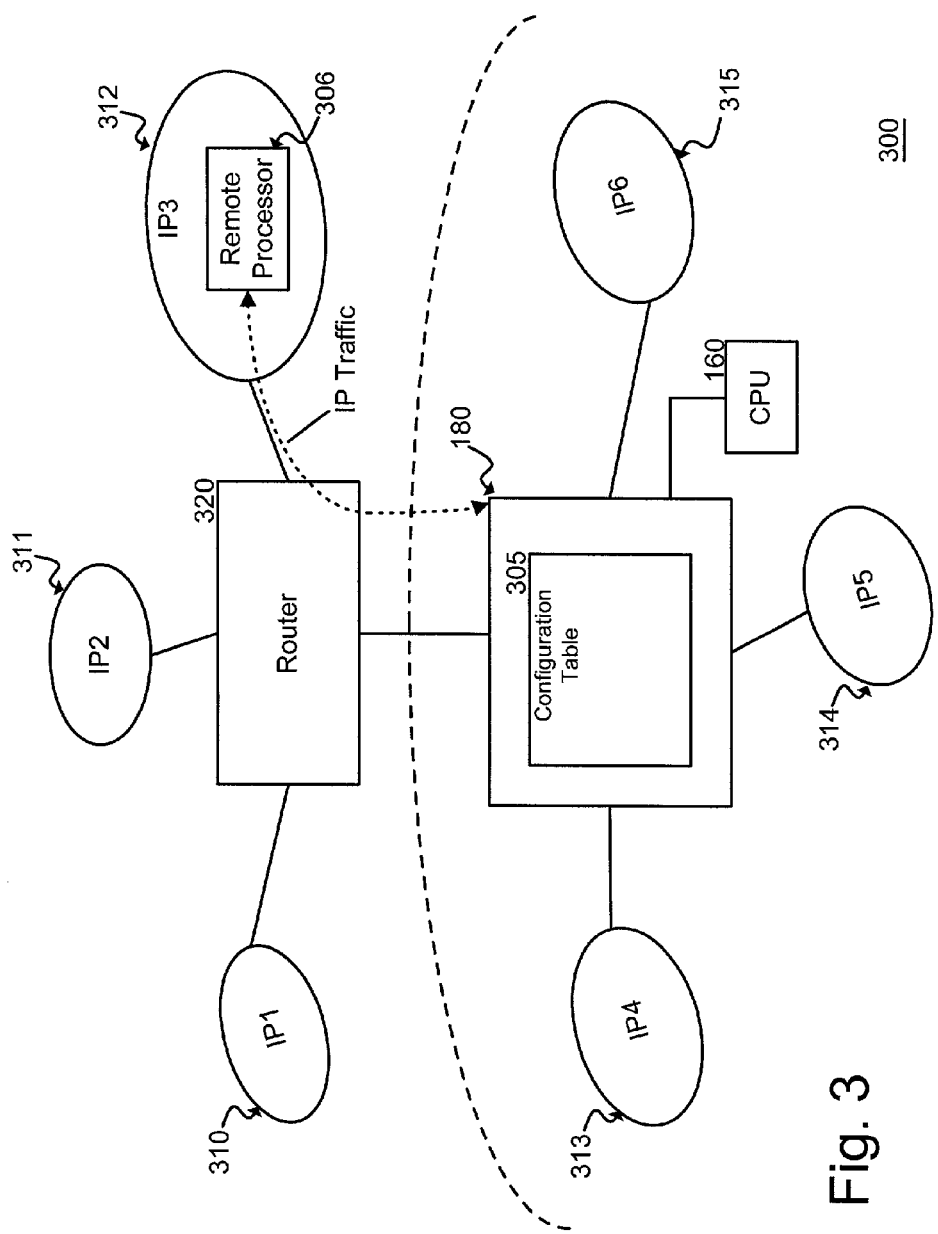
FIG. 3 is a high level diagram illustrating the multiport switch of FIG. 2 implemented within a network including multiple subnets.

FIG. 3 is a high level diagram illustrating multiport switch 180 implemented in a wide area network 300. Network 300 includes a number of subnets 310–315 (labeled in FIG. 3 as "IP1" through "IP6"). Each subnet, may contain, for example, a number of network devices connected using layer 2 or layer 3 switches. Network 100, for example, may correspond to one of subnets 310–315.

Multiport switch 180 directly connects to, and handles inter-subnet packet traffic from subnets 313–315. When multiport switch 180 receives packets destined for a subnet other than subnets 313–315, it forwards the packets to router 320. The multiport switch 180 may direct packets traveling within a subnet to their destination devices using the layer 2

MAC address associated with the destination device. The multiport switch 180 may direct packets traveling across subnets to the appropriate subnet using their layer 3 IP address.

Router 320 may dynamically learn the location of subnets 310–315, by executing routing protocols. Multiport switch 180, unlike router 320, does not execute routing protocols to dynamically learn the configuration of network 300. Instead, multiport switch 180 is directly programmed with a listing of the subnets with which it is connected. As shown in FIG. 3, multiport switch 180 directly connects, via output ports in transmitter 210, to subnets 313–315 and to router 320.

Multiport switch 180 stores a list of the subnets with which it is connected in configuration table 305. Host processor 160 may be directly connected to multiport switch 180 and may access and modify the values in configuration table 305. Remote processor 306, which may be implemented in a distant subnet, such as subnet 312, communicates with host processor 160 through the network 300. In this manner, and as will be described in more detail below, host processor 160 provides remote configuration and monitoring functions for multiport switch 180.

FIG. 4 is a diagram illustrating configuration table 305 in more detail. Table 305 may include subnet identification IP addresses and their corresponding port information in multiport switch 180. For example, as shown, the first address 401 may be the address of subnet 313, which connects to multiport switch 180 through the port vector listed in port vector field 402 (e.g., port number one). Configuration table 305 may be implemented in external memory 170 or in a memory in multiport switch 170, such as a memory in IRC 245.

When forwarding packets in network 300, multiport switch 180 determines the appropriate output port for a packet by comparing the packet's IP destination address to entries in the subnet IP identification field of configuration table 305. Based on this comparison, IRC 245 constructs a forwarding descriptor that identifies the output port(s) for the packets. The forwarding descriptor is then used by PVQ 235, output control queues 240, and transmitter 210 to transmit the packet on the appropriate output port(s).

Occasionally, the configuration of the subnets connected to multiport switch 180 may change. In this situation, configuration table 305 may be updated to reflect the change. Consistent with an aspect of the present invention, this may be performed by remote processor 306.

To facilitate packet-based communication over network 300 between remote processor 306 and multiport switch 180, host processor 160 may execute a TCP/IP stack and multiport switch 180 may be assigned a unique IP address. Through the TCP/IP protocol, remote processor 306 may communicate with host processor 160. Assigning a unique IP address to multiport switch 180 makes it uniquely addressable in network 300. In this manner, remote processor 306 may communicate with host processor 160 through network 300.

Through remote processor 306, a remote system administrator can reconfigure table 305, and thus reconfigure how multiport switch 180 handles the forwarding of inter-subnet packets. Additionally, host processor 160 can transmit management and control information relating to multiport switch 180 to remote processor 306, thus allowing a remote system administrator to monitor the status of the multiport switch 180.

Although only one multiport switch 180 is shown in FIG. 3, remote processor 306 may monitor and control the configuration tables of multiple multiport switches 180. Each switch 180 is assigned a unique IP address through which remote processor 306 can communicate with it.

As described above, a remote processor is implemented to monitor and configure a multiport network switch. To facilitate the connection of the remote processor to the multiport network switch, a host processor local to the multiport network switch runs a TCP/IP communication stack and the multiport switch is assigned a unique IP address.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed is:

1. A system for transmitting packets of information, comprising:
    a multiport switch connected to a plurality of subnets through ports of the multiport switch, each of the plurality of subnets being associated with a subnet Internet Protocol (IP) address, the multiport switch further including a configuration table storing associations between the subnet IP addresses and the ports of the multiport switch;
    a host processor connected locally to the multiport switch, the multiport switch determining appropriate ones of the output ports to output the packets based on the configuration table and destination information in the packets; and
    a remote processor communicating with the multiport switch through the host processor using an IP address assigned to the multiport switch, the remote processor remotely configuring the configuration table in the multiport switch.

2. The system of claim 1, wherein the host processor communicates with the remote processor through a TCP/IP stack.

3. The system of claim 1, further including:
    a router coupled to at least one port of the multiport switch.

4. The system of claim 3, wherein the router is coupled to a second plurality of subnets, the second plurality of subnets connecting to the multiport switch through the router.

5. The system of claim 4, wherein the remote processor is located in one of the second plurality of subnets.

6. The system of claim 1, wherein the multiport switch is a layer 3 switch.

7. The system of claim 1, wherein the host processor is configured to transmit status information relating to the multiport switch to the remote processor.

8. A method of processing packets in a network device, comprising:
    receiving a packet at one of a plurality of receive ports in the network device, the packet including address information that indicates at least a destination subnet for the packet;
    determining output ports in the network device for the packet based on the address information and based on information in a configuration table;
    forwarding the packet to the destination subnet via the identified one or more output ports; and
    allowing a remote processor to remotely configure the configuration table, the remote processor transmitting information to configure the configuration table using an IP address uniquely assigned to the network device.

9. The method of claim 8, wherein the remote processor communicates with the network device through a host processor connected to the network device.

10. The method of claim 9, wherein the host processor executes a TCP/IP stack.

11. The method of claim 9, wherein the host processor transmits status information relating to the network device to the remote processor.

12. The method of claim 8, wherein the network device is a layer 3 switch.

13. A network device for routing packets received in a packet-switched network comprising:

means for receiving the packets from the network, each of the packets having information that includes at least destination information that indicates an intended destination subnet for the packet;

a configuration table storing associations between Internet Protocol (IP) addresses of subnets and output ports of the multiport switch, the configuration table being remotely updated to reflect configuration information received from a remote processor;

means for determining appropriate output ports in the network device for the received packets based on the destination information and the configuration table; and transmit means for transmitting the packets from the output ports determined by the means for determining.

14. The network device of claim 13, further including:

a host processor connected locally to the network device, the host processor communicating with the remote processor.

15. The network device of claim 14, wherein the host processor communicates with the remote processor through a TCP/IP stack.

16. The network device of claim 14, wherein the host processor transmits status information relating to the network device to the remote processor.

17. The network device of claim 13, wherein the network device is assigned a unique IP address.

18. The network device of claim 13, wherein the network device is a layer 3 switch.

\* \* \* \* \*